(12) United States Patent
Miller

(10) Patent No.: US 6,577,402 B1
(45) Date of Patent: *Jun. 10, 2003

(54) SENSOR AND METHOD FOR MEASURING CHANGES IN ENVIRONMENTAL CONDITIONS

(75) Inventor: Mark S. Miller, Apple Valley, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 404 days.

This patent is subject to a terminal disclaimer.

(21) Appl. No.: 09/583,590

(22) Filed: May 31, 2000

Related U.S. Application Data

(63) Continuation-in-part of application No. 09/126,253, filed on Jul. 30, 1998, now Pat. No. 6,118,534.

(51) Int. Cl.$^7$ .................................................. G01B 9/02
(52) U.S. Cl. ....................... 356/505; 356/35.5; 356/498
(58) Field of Search ................................ 356/35.5, 480, 356/506, 477, 505, 496, 498, 507, 450, 482, 519

(56) References Cited

U.S. PATENT DOCUMENTS

| | | | |
|---|---|---|---|
| 3,639,063 A | 2/1972 | Krogstad et al. | 356/106 |
| 3,831,137 A | 8/1974 | Cuomo | 340/8 R |
| 4,295,739 A | 10/1981 | Meltz et al. | 374/161 |
| 4,492,121 A | 1/1985 | Lehto | 73/705 |
| 4,599,711 A | 7/1986 | Cuomo | 367/141 |
| 4,678,904 A | 7/1987 | Saaski et al. | 250/227 |
| 4,747,688 A | 5/1988 | Geary | 356/345 |
| 4,770,047 A | 9/1988 | Arditty et al. | 73/800 |
| 4,843,233 A | 6/1989 | Jeunhomme | 250/227 |
| 4,870,269 A | 9/1989 | Jeunhomme et al. | 250/227 |
| 4,897,542 A | 1/1990 | Dakin et al. | 250/227 |
| 4,926,696 A | 5/1990 | Haritonidis et al. | 73/205 |
| 4,932,782 A | 6/1990 | Graindorge et al. | 356/358 |
| 4,958,930 A | 9/1990 | Robertson, Jr. | 356/357 |
| 4,994,677 A | 2/1991 | Graindorge | 250/560 |
| 5,115,677 A | 5/1992 | Martin et al. | 73/64.48 |
| 5,128,537 A | 7/1992 | Hälg | 250/231.19 |
| 5,141,316 A | 8/1992 | Lefèvre et al. | 356/350 |
| 5,162,872 A | 11/1992 | Vanasse | 356/352 |
| 5,181,078 A | 1/1993 | Lefevre et al. | 356/350 |
| 5,202,939 A | 4/1993 | Belleville et al. | 385/12 |
| 5,270,791 A | 12/1993 | Lefevre et al. | 356/350 |
| 5,280,173 A | 1/1994 | Morse et al. | 250/227.23 |
| 5,301,001 A | 4/1994 | Murphy et al. | 356/35.5 |
| 5,337,142 A | 8/1994 | Lefevre et al. | 356/350 |
| 5,349,439 A | 9/1994 | Graindorge et al. | 356/346 |
| 5,392,117 A | 2/1995 | Belleville et al. | 356/352 |
| 5,394,243 A | 2/1995 | de Mollerat du Jeu | 356/352 |
| 5,589,641 A | 12/1996 | Johnson et al. | 73/800 |
| 5,594,744 A | 1/1997 | Lefevre et al. | 372/20 |
| 5,610,845 A | 3/1997 | Slabinski et al. | 364/565 |

OTHER PUBLICATIONS

Product brochure, "Metricor 2000 The Universal Fiber–Optic–Sensor Instrument", 4 pages.
Product literature, "Microchip Technology", 7 pages.

*Primary Examiner*—Frank G. Font
*Assistant Examiner*—Andrew H. Lee
(74) *Attorney, Agent, or Firm*—Westerman, Champlin & Kelly

(57) ABSTRACT

A sensor has an interferometer which measures a change in an applied environmental condition relative to a reference environmental condition. The interferometer is operated under the applied environmental condition to generate an interference spectrum. Intensities of the interference spectrum are measured at first and second wavelengths, respectively. The first and second wavelengths correspond to first and second reference intensities that are separated from one another by an odd number of extrema in the interference spectrum when the interferometer is operated under the reference condition. Measurement of the change in the applied environmental condition is based on the measured intensities and the first and second reference intensities.

18 Claims, 4 Drawing Sheets

US 6,577,402 B1

SENSOR AND METHOD FOR MEASURING CHANGES IN ENVIRONMENTAL CONDITIONS

CROSS-REFERENCE TO RELATED APPLICATION

This application is a continuation-in-part of U.S. application Ser. No. 09/126,253, now U.S. Pat. No. 6,118,534 filed Jul. 30, 1998, and entitled "SENSOR AND METHOD FOR MEASURING CHANGES IN ENVIRONMENTAL CONDITIONS."

BACKGROUND OF THE INVENTION

The present invention relates to a sensor and method for measuring changes in environmental conditions. In particular, the present invention relates to a sensor and method using an optical interferometer for an accurate determination of small changes in pressure, temperature or the like.

In the aerospace industry sensors are used to make critical measurements for flight control, engine control and cockpit display systems. These sensors include pitot-static probes, air temperature sensors, engine temperature sensors, pressure sensors, angle-of-attack sensors and stall warning sensors. Interferometers have been used in some sensors for measuring the selected parameters. An example of an interferometer is a Fabry-Perot interferometer, which has two partially reflective surfaces that are separated from one another. The environmental condition or parameter to be measured is operably coupled to one or both of the reflective surfaces such that a change in the parameter changes the distance between the surfaces or the optical properties of the media between the surfaces. The interferometer measures the distance between the reflective surfaces based on interference between light reflecting from the surfaces. A variety of different interferometric sensors make use of this principle.

SUMMARY OF THE INVENTION

The sensor and method of the present invention measure a change in an applied environmental condition relative to a reference environmental condition. In one aspect of the present invention, the method includes: operating an interferometer under the applied environmental condition to generate an interference spectrum; measuring intensities of the interference spectrum at first and second wavelengths, wherein the first and second wavelengths correspond to first and second reference intensities that are separated from one another by an odd number of extrema in the interference spectrum when the interferometer is operated under the reference condition; and measuring the change in the applied environmental condition based on the measured intensities at the first and second wavelengths and the first and second reference intensities.

In another aspect of the present invention, the sensor includes optical elements defining an optical path operably coupled to the environmental condition upon exposure of the sensor to the environmental condition. A polychromatic light source is optically coupled to first and second reflective surfaces. A spectral element is optically coupled to the first and second reflective surfaces and spatially disperses light received from the first and second reflective surfaces as a function of wavelength. First and second light sensitive elements are optically coupled to the spectral element and are positioned to receive light from the spectral element at selected first and second respective wavelength ranges. The first and second light sensitive elements have outputs which are representative of light intensity within the first and second wavelength ranges. A measurement apparatus measures the change in the environmental condition based on the outputs of the first and second light sensitive elements and based on first and second reference values. The first and second reference values represent light intensities within the first and second wavelength ranges that are separated from one another by an odd number of extrema in intensity as a function of wavelength of the light spatially dispersed by the spectral element, when the sensor is exposed to a reference environmental condition.

Another aspect of the present invention is directed to a method of calibrating a sensor for measuring changes in an environmental condition. The method includes: selecting an expected value of the environmental condition as a reference condition; operating a polychromatic interferometer under the reference condition to obtain an interference pattern in terms of an intensity as a function of wavelength; choosing first and second wavelengths that are separated from one another by an odd number of local extrema in the intensity as a function of wavelength; and storing a representation of the intensity of the interference pattern at the first and second chosen wavelengths

DETAILED DESCRIPTION OF THE PREFERRED EMBODIMENTS

Changes in environmental conditions, such as pressure, temperature, strain or refractive index, relative to a reference condition can be monitored with high accuracy and speed by monitoring an interferometer signal at two or more wavelengths according to the present invention. The two wavelengths are selected to have, under the reference condition, a relatively large slope with respect to the output signal (e.g., voltage) as a function of wavelength. The monitoring of at least two wavelengths provides accurate and fast measurements of small environmental changes because the large slope leads to significant changes in signal for proportionally small changes in the spectrum. Preferably, the magnitude of the slope is a local maximum. If the wavelengths are selected at local extrema in the slope on either side of an extremum in the signal, small changes in environmental condition will result in approximately equal and opposite changes in signal at the two wavelengths that can be accurately correlated with values of, or changes in, the environmental condition.

Interferometers can be based on a variety of designs. For example, Fabry-Perot interferometers produce an interference pattern that is very sensitive to variations in both the distance and the optical properties of the medium between two optically reflecting surfaces. This sensitivity to distance variation and optical property variation is exploited by the present invention for accurate measurements of an environmental condition. In particular, if the location of one of the surfaces is sensitive to the environmental condition being monitored, the interferometer can be used in a sensor to evaluate fluctuations in the environmental condition. To produce a signal at the two wavelengths discussed above, a diffractive element spatially disperses polychromatic light according to wavelength of the light following the reflection of the polychromatic light off the two optically reflective surfaces. A variety of detection systems can be used to detect the reflected, spatially dispersed light, as described below. Other types of interferometers can be used in place of the Fabry-Perot interferometer.

Figure 1:
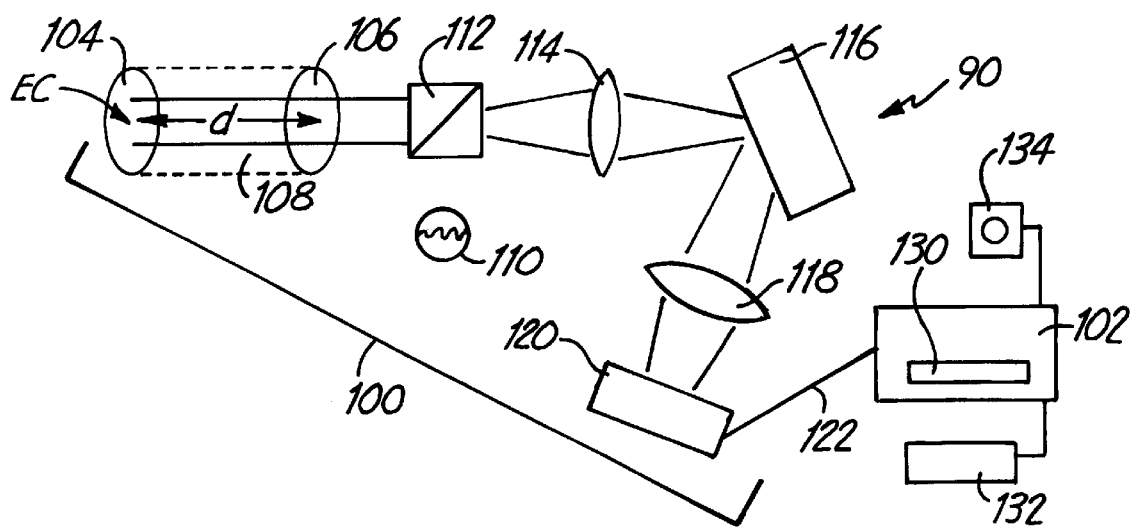
FIG. 1 is a schematic layout of a measurement apparatus according to one embodiment of the invention.

FIG. 1 is a schematic representation of a sensor apparatus according to one embodiment of the present invention. Sensor apparatus 90 includes Fabry-Perot interferometer 100 and processor 102. Interferometer 100 includes reflective surfaces 104 and 106, interference cavity 108, polychromatic light source 110, beam splitter 112, collimating lens 114, diffraction grating 116, objective lens 118 and optical detector 120. Surface 104 and surface 106 are separated from one another by an optically transparent medium, which forms interference cavity 108. Interference cavity 108 has a length d. In some embodiments, reflective surface 104 further serves as a transducer that moves or distorts in response to changes in an environmental condition (EC) to alter the length d of interference cavity 108. Surface 104 and surface 106 define an optical path through a portion of the interferometer.

In alternative embodiments, interferometer 100 can have the design of a Michelson interferometer, a Mach-Zehnder interferometer, a Sagnac interferometer or others. A Michelson interferometer splits the source light into two optical paths each of which is reflected and recombined. A Mach-Zehnder interferometer splits the source light into two optical paths that are later recombined in order to determine differences in the two optical paths. A Sagnac interferometer is based on counter propagating light waves within an angular path.

Polychromatic light source 110 provides light that is directed by suitable optics such as beam splitter 112 through second reflective surface 106 and into the interference cavity 108. Polychromatic light source 110 preferably is a white light source such as an incandescent bulb. The light directed into interference cavity 108 reflects off of surfaces 104 and 106.

Light is transmitted back through surface 106 to beam splitter 112 as a return, reflected light beam. The combination of reflections from surfaces 104 and 106 forms a conventional optical interference signal. Beam splitter 112 directs the return, reflected light beam to collimating lens 114, which collimates the return, reflected light beam. Collimating lens 114 may be eliminated in alternative embodiments if the light from beam splitter 112 is already sufficiently collimated. The collimated light beam leaving collimating lens 114 impinges on diffraction grating 116. Diffraction grating 116 spatially disperses the collimated light beam according to wavelength or frequency. Objective lens 118 focuses the wavelength dispersed light beam from diffraction grating 116 onto optical detector 120. In alternative embodiments, other optical elements such as mirrors, lenses and the like can be used, as desired, to direct and/or focus light in the light path from the interference cavity 108 to optical detector 120.

In one embodiment, optical detector 120 includes a plurality of light sensitive elements, such as charge-coupled devices (CCDs), photomultiplier tubes or light sensitive diodes, formed into a linear array. Each element of the array measures a particular wavelength region based on its position relative to the wavelength dispersed light beam from diffraction grating 116. The array preferably includes a moderately large number of elements, preferably 128 or more elements and more preferably 256 or more elements. The size of the array and the arrangement of the optical components determines the spectral range measured by the array. In some embodiments, the array has a spectral range sufficient to measure one or more extrema in the interference pattern.

In alternative embodiments, the detector includes two or more individual light sensitive elements positioned as desired. In other alternative embodiments, a two dimensional array or a combination of a linear array and individual light sensitive elements is used. For example, a linear array can be used to establish a reference intensity curve while the individual elements are used to measure intensity at selected wavelengths. With a combination of a linear array and individual elements, the linear array can have lower resolution in wavelength to identify suitable wavelengths in the reference intensity curve for monitoring. Then, individual light sensitive elements at the selected wavelengths are used for monitoring the change in the environmental condition of interest. The light sensitive elements are placed just above or below the linear array.

The size of the light sensitive elements, either in an array or as individual elements, and the spectral properties of diffraction grating 116 determine the wavelength range that registers with each element and thus the sensitivity of the detector. Each light sensitive element or "pixel" within optical detector 120 generates a signal, such as a voltage, which has a magnitude that is a function of the intensity of light detected within that element. The intensity within a wavelength range reflects the interference pattern, which is a function of the distance between surfaces 104, 106.

Optical detector 120 has an output 122 which is coupled to processor 102. Output 122 can include the voltage signals from each light sensitive element or a digital signal representing light intensity or "grey value" within each element, for example. Processor 102 is any suitable processor or microprocessor and can include an analog-to-digital converter. In alternative embodiments, processor 102 is replaced by an analog circuit or a combination of an analog circuit and a digital processor. Processor 102 includes some form of memory 130, a display 132 and an input device 134. Suitable devices for display 132 include, for example, a digital display, lights indicating values within certain thresholds or an audible alarm that sounds if the measured environmental condition exceeds a threshold value.

Figure 2:
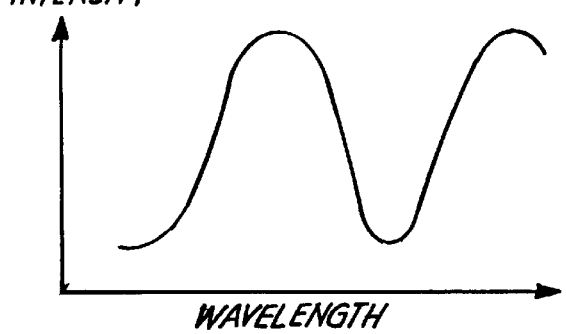
FIG. 2 is a plot of spectral intensity as a function of wavelength for a representative interference spectrum generated in the measurement apparatus shown in FIG. 1.
Figure 3:
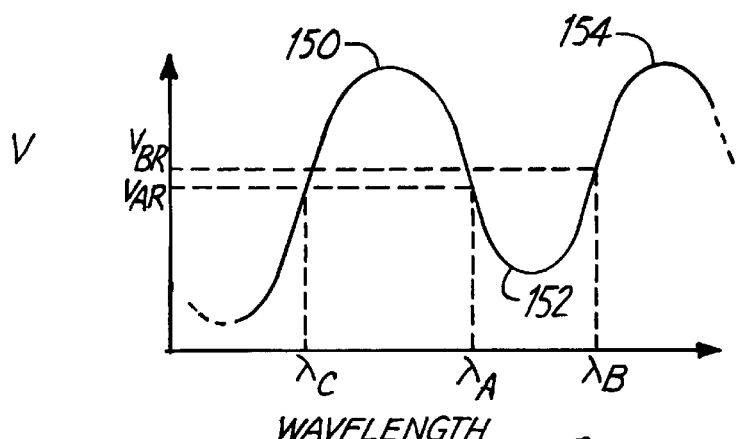
FIG. 3 is a representative plot of voltage as a function of wavelength where the voltage corresponds to the output of an optical detector array in the measurement apparatus and where the sensor is subject to a selected reference environmental condition.

As discussed above, an interference spectrum is formed by the light reflected from surfaces 104 and 106. FIG. 2 is a representative plot of intensity as a function of wavelength for the interference spectrum. The different wavelengths of the reflected light are spatially separated by the diffraction grating 116, which provides for measurement of the interference spectrum using optical detector 120. FIG. 3 is a plot illustrating voltage output as a function of wavelength for the light sensitive elements within optical detector 120. Each light sensitive element of detector 120 produces a value ($V=f(\lambda)$) at a discrete point on the continuous curve displayed in FIG. 3.

Sensor 90 is calibrated by applying a reference environmental condition to the transducer portion of interferometer 100 so that processor 102 first obtains a reference curve, for example as shown in FIG. 3. The reference condition is preferably an expected average value of the operating condition, such as an expected pressure, under which the sensor will be used. Using a linear array for optical detector 120, processor 102 can obtain multiple points along the curve of FIG. 3 from the output of optical detector 120. In alternative embodiments, one or two light sensitive elements are used as optical detector 120. To obtain the curve of FIG. 3 with one or two light sensitive elements, a moving optical element such as a mirror scans the wavelength spectrum across the light sensitive elements to evaluate a sufficient portion of the curve. As long as the reference environmental condition is sufficiently constant for a period of time, the amount of time needed to obtain a reference curve generally is relatively unimportant.

The particular plot in FIG. 3 has three extrema 150, 152, 154. Based on the interference spectrum produced under the reference environmental condition, two wavelengths, $\lambda_A$ and $\lambda_B$, are selected with the two wavelengths being on opposite sides of a single extremum, either a minimum or a maximum in the curve. In the embodiment shown in FIG. 3, $\lambda_A$ and $\lambda_B$ are located on opposite sides of minimum 152. The light sensitive elements corresponding to wavelengths $\lambda_A$ and $\lambda_B$ produce voltages $V_{AR}$ and $V_{BR}$, respectively, when sensor 90 is operated under the reference environmental condition. While two selected wavelengths generally are sufficient to obtain very accurate results, additional wavelengths, such as $\lambda_C$, can be selected to be monitored by processor 102.

To improve the sensitivity and accuracy, the selected wavelengths preferably are at or near local maxima in the slope of the intensity curve as a function of wavelength. Generally, a selected wavelength has a value that is positioned away from the closest extrema by at least about ¼ of the wavelength difference between the nearest local maximum and the nearest local minimum. In other words, the selected wavelength is in the central half of the wavelength span between the nearest local maximum and the nearest local minimum.

Figure 4:
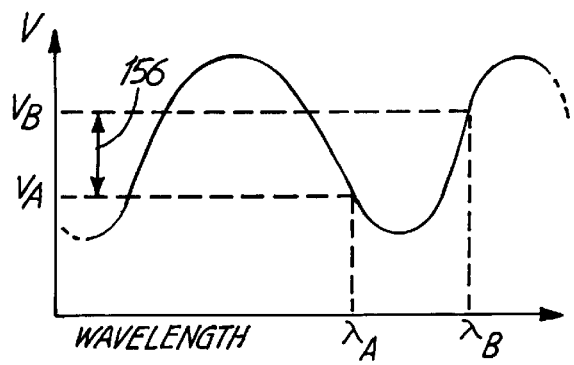
FIG. 4 is a representative plot of voltage as a function of wavelength obtained under environmental conditions varying from the reference environmental conditions of FIG. 3.

Once sensor 90 is prepared for measuring a particular reference environmental condition by selecting $\lambda_A$ and $\lambda_B$, sensor 90 is exposed to the environmental condition to be monitored. Changes in the environmental condition relative to the reference environmental condition result in a change in the physical path length d of cavity 108. This results in a shift in the interference spectrum and thus a shift in the voltages $V_A$ and $V_B$ at wavelengths $\lambda_A$ and $\lambda_B$, as shown by arrow 156 in FIG. 4. Shift 156 is exaggerated for illustrative purposes. Actual voltage shifts are much smaller in typical applications. For example, for an interference pattern having a peak-to-peak voltage of about 5 volts, $V_A$ and $V_B$ may shift from about +/−0.05 volts to about +/−0.1 volts. Small changes in the environmental condition do not cause the extrema in the interference spectrum to shift significantly from is location between $\lambda_A$ or $\lambda_B$ while monitoring the environmental condition. The shift in $V_A$ and $V_B$ relative to one another and relative to $V_{AR}$ and $V_{BR}$ is used by processor 102 to detect a change in the value of the environmental condition.

Figure 5:
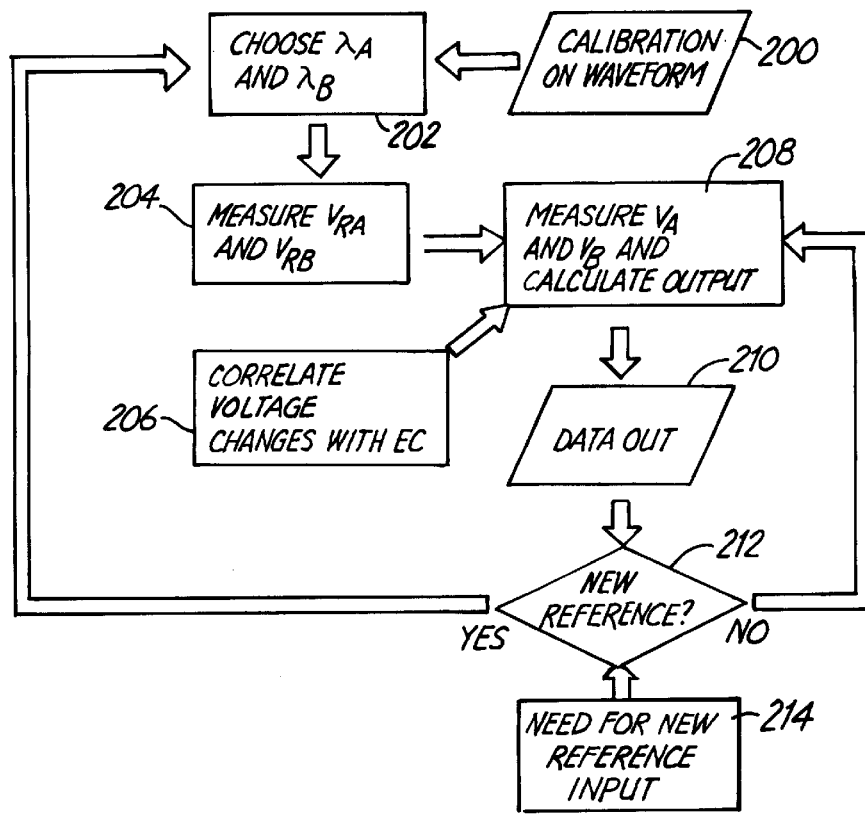
FIG. 5 is a block diagram outlining a process for evaluating a change in environmental condition according to one embodiment of the present invention.

The procedure for evaluating the value of the environmental condition is outlined in a flow chart in FIG. 5. In step 200, sensor 90 is operated under the expected, reference environmental condition. This step can be performed in the laboratory by the manufacturer of the sensor or in the field by the user. Once a reference intensity (or voltage) curve has been collected by processor 102, processor 102 selects $\lambda_A$ and $\lambda_B$ on either side of at least one extremum in the curve, as described above, using pattern recognition software stored in memory 130 or using a known separation in wavelength between the peak and the selected wavelengths $\lambda_A$ and $\lambda_B$, at step 202. Alternatively, processor 102 displays the reference curve on display 132, and the user selects wavelengths $\lambda_A$ and $\lambda_B$ and inputs the selections through input device 134. In step 204, the processor 102 monitors the reference voltages $V_{AR}$ and $V_{BR}$ at wavelengths $\lambda_A$ and $\lambda_B$ and stores the voltages for later use. These values can be stored in memory 130 or processor 102.

Step 206 involves the correlation of the voltage output with changes in the environmental condition. The simplest way to correlate the values is to apply known values of the condition to sensor 90 and measure the corresponding change in voltage output at $\lambda_A$ and $\lambda_B$. The correlation relationship can be stored for future reference such that a measured value of voltage can be correlated with a value of the condition by comparison with the stored correlation relationship. Alternatively, the physical properties of the transducer can be used to estimate the magnitude of shifts in the interference spectrum of FIG. 4 due to the change in position of the transducer resulting from the change in environmental condition. The correlation information is stored in memory 130.

Once wavelengths $\lambda_A$ and $\lambda_B$ have been chosen and the correlations between voltage and the environmental condition have been determined, sensor 90 is exposed to the varying environmental condition to be monitored. At step 208, voltages $V_A$ and $V_B$ at $\lambda_A$ and $\lambda_B$ are measured and the value of or changes in the environmental condition is determined. The voltages van be measured discretely at $\lambda_A$ and $\lambda_B$, or can be measured over range of wavelengths in analog or digital form. Small changes in the environmental condition can be evaluated from the measured values of the intensity (as represented by $V_A$ and $V_B$) based on the following expression:

$$[V_A - V_B] - [V_{AR} - V_{BR}] \alpha \text{ change in } EC,$$

where $V_A$ is the output voltage value at $\lambda_A$ at the time of measurement, $V_B$ is the output voltage at $\lambda_B$ at the time of measurement, $V_{AR}$ is the voltage value at $\lambda_A$ under the reference condition, and $V_{BR}$ is the voltage value under the reference condition. Small changes can be measured more accurately with the preferred selections of $\lambda_A$ and $\lambda_B$ at maxima in the slope of the reference voltage since a small change in the cavity length results in a larger change in $V_A$ and $V_B$ than at the extrema. Also, the changes in $V_A$ and $V_B$ will be roughly equal and opposite, which can allow differentiation between a cavity length change and noise such as electrical, electromagnetic and electromechanical noise. Noise results in random movements in $V_A$ and $V_B$. At step 210, processor 102 provides a data output to display 132, for example, which represents a measurement of the change in the environmental condition.

In principle, it is possible for the reference curve to be determined only once for a particular installation of sensor 90. The reference curve, however, can be reevaluated to account for a change in the reference condition, such as a shift or change in the average or steady state value of the environmental condition being monitored. Additionally, the reference curve can be reevaluated to ensure that no changes in the physical characteristics of sensor 90 have taken place due to the passage of time. The determination to perform a new evaluation at the reference conditions is input at step 214. This determination can be made by a user selection through input device 134, or by processor 102 based on a timer or a desired diagnostic algorithm. If a new reference curve needs to be made, at step 212, processor 102 returns to step 202. Otherwise, processor 102 returns to step 208 and continues to monitor $V_A$ and $V_B$.

Figure 6:
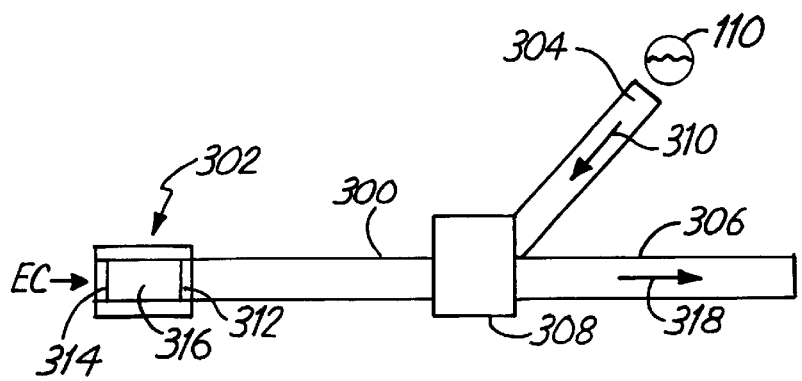
FIG. 6 is a schematic, sectional view of a sensing portion of a measurement apparatus according to an alternative embodiment of the present invention.

FIG. 6 is a cross-sectional view of an optical fiber 300 coupled to an interferometer sensor tip 302 according to one embodiment of the present invention. Light from the light source 110 is introduced into the optical fiber 304. Fiber 304 directs the light in the direction indicated by arrow 310 toward fiber optic coupler 308. Sensor tip 302 is mounted to the distal end of fiber 300 and includes reflective surfaces 312 and 314, which are separated from one another and define an interference cavity 316 therebetween. In one embodiment, reflective surface 312 is formed by the distal surface of fiber 300. The environmental condition "EC", such as pressure or temperature, is applied to surface 314 for affecting the optical path length of cavity 316. Fiber 300 then directs the reflections back to coupler 308, and coupler 308 passes a portion of these reflections to fiber 306. Fiber 306 directs reflected light from surfaces 312 and 314 in the direction indicated by arrow 318 toward a detection portion 320 of the interferometer, as shown in FIG. 7.

Figure 7:
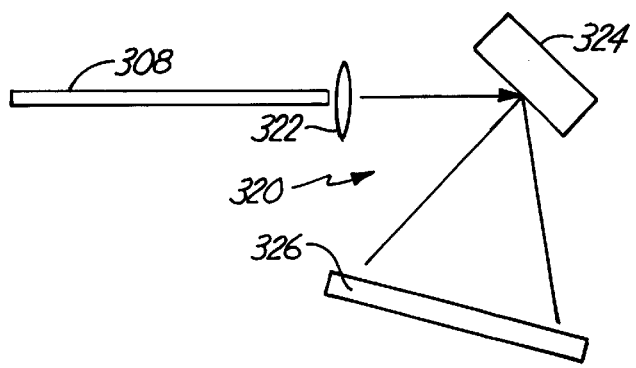
FIG. 7 is a schematic view of a detection portion of the measurement apparatus shown in FIG. 6.

FIG. 7 is a schematic diagram illustrating detection portion 320. Optical fiber 306 directs light through collimating lens 322 toward diffraction grating 324. From diffraction grating 324, light is directed to detector array 326. Additional optical elements (e.g., mirror and/or lenses) can be placed between optical fiber 306 and detector array 326. The output of detector array 226 is directed to a processor or the like for analysis, as described with respect to FIGS. 1–5 above.

Figure 8:
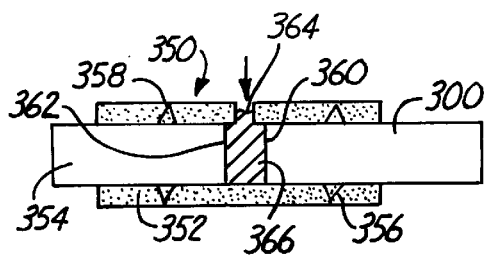
FIG. 8 is a sectional view of an embodiment of a sensor tip of FIG. 6 designed to measure changes in index of refraction.

FIGS. 8–11 show four specific embodiments of sensor tip 350, which are useful in the fiber optic embodiments described with respect to FIGS. 6 and 7 above. The same reference numbers are used in FIGS. 8–10 for the same or similar elements. In FIG. 8, sensor tip 350 is configured to measure index of refraction. The walls of sensor tip 350 are formed by a glass capillary tube 352, which surrounds the distal end of optical fiber 300 and a reflector 354, which are secured at bond areas 356 and 358, respectively. Reflective surface 360 is formed by the distal end of fiber 300, and reflective surface 362 is formed by the end of reflector 354. Capillary tube 352 has a fluid port 364 to provide a path for introducing a fluid to be measured into interference cavity 366. Differences between the refractive index of the fluid in cavity 366 and a reference fluid results in a shift in the interference spectrum of the light returned down fiber 300. This difference in index of refraction can reflect changes in composition, concentrations and other modifications of the liquid.

Figure 9:
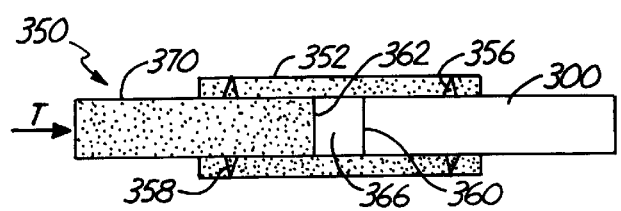
FIG. 9 is a sectional view of an alternative embodiment of the sensor tip of FIG. 6 designed to measure temperature changes.

In FIG. 9, sensor tip 350 has a temperature input T that is thermally coupled to thermally conductive element shown by metal wire 370. Metal wire 370 has an end surface, which forms optically reflective surface 362. Changes in temperature T change the length of wire 370 due to thermal expansion/contraction which, in turn, changes the length of the interference cavity 366 between wire 370 and fiber 300. Thus, the sensor in FIG. 9 is useful as a temperature probe.

Figure 10:
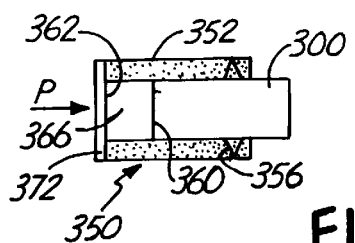
FIG. 10 is a sectional view of another alternative embodiment of the sensor tip of FIG. 6 designed to measure pressure changes.

In FIG. 10, sensor tip 350 has a pressure input P, which is pneumatically coupled to reflective surface 362. In this embodiment, reflective surface 362 is located on reflective diaphragm 372. Reflective surface 360 is located at the end of fiber 300. Changes in pressure P cause diaphragm 372 to deform and cause a resulting change in the length of cavity 366 between diaphragm 372 and fiber 300.

Figure 11:
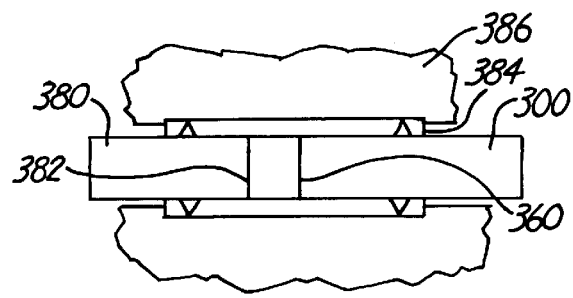
FIG. 11 is a sectional view of another alternative embodiment of the sensor tip of FIG. 6 designed to measure strain.

In FIG. 11, sensor tip 350 includes fiber 380 that forms a reflective surface 382 opposite reflective surface 360. Tube 384 connects fiber 300 with fiber 380. Tube 384 is embedded in material 386 subject to strain. A change in strain within material 386 causes a change in the distance between surfaces 360 and 362. Sensor tip 350 in FIG. 11 therefore is useful for the measurement of strain. Strain can be measured to evaluate mechanical properties such as fracture toughness and fatigue. Other sensor structures also can be used with the present invention.

Figure 12:
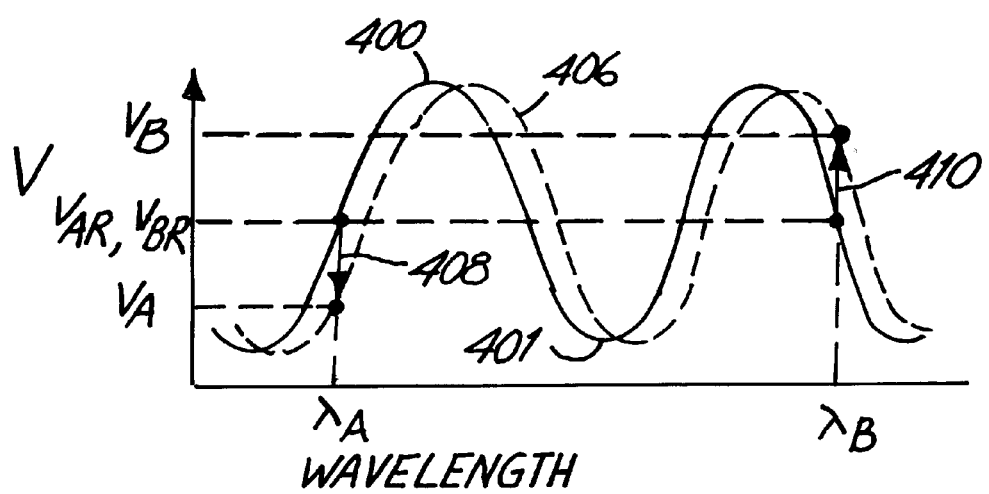
FIG. 12 is a representative plot of voltage as a function of wavelength, which illustrates the selection of first and second wavelengths that are separated by an odd number of local extrema in voltage when the sensor is subject to a selected reference environmental condition.

FIG. 12 is a representative plot of voltage as a function of wavelength, which illustrates a method of selecting the first and second wavelengths at which changes in the environmental condition are monitored, according to an alternative embodiment of the present invention. Similar to the plot of FIG. 3, when the transducer portion of interferometer 100 (shown in FIG. 1) is subject to the reference environmental condition, each light sensitive element of detector 120 (also shown in FIG. 1) produces a voltage value (V=f($\lambda$)) at a discrete point on the continuous curve displayed in FIG. 12. These voltage values represent intensity within the interference spectrum as a function of wavelength.

Based on the interference spectrum produced under the reference environmental condition, first and second wavelengths $\lambda_A$ and $\lambda_B$ are selected such that $\lambda_A$ and $\lambda_B$ correspond to first and second reference intensities which are separated from one another by an odd number of extrema in the interference spectrum. In the example shown in FIG. 12, wavelengths $\lambda_A$ and $\lambda_B$ correspond to intensities that are separated from one another by three extrema, which are labeled 400, 401 and 402. However, wavelengths $\lambda_A$ and $\lambda_B$ can be separated from one another by only a single extremum as shown in FIG. 3 or a greater number of extrema. The light sensitive elements corresponding to wavelengths $\lambda_A$ and $\lambda_B$ produce reference voltages $V_{AR}$ and $V_{BR}$, respectively, when sensor 90 is operated under the reference environmental condition.

Waveform 406 (shown in phantom) represents the interference spectrum produced by interferometer 100 after there has been a small change in the environmental condition relative to the reference environmental condition. Separating wavelengths $\lambda_A$ and $\lambda_B$ by an odd number of extrema ensures that changes in the environmental condition during normal operation of the sensor cause the voltages at wavelengths $\lambda_A$ and $\lambda_B$ to change in opposite directions, as shown by arrows 408 and 410. This results in an amplification of the measurement $V_A-V_B$, which increases the signal-to-noise ratio. If there were an even number of extrema between $\lambda_A$ and $\lambda_B$, $V_A$ and $V_B$ would change in the same direction, resulting in no noise reduction.

The embodiments described above are intended to be representative and not limiting. Although the present invention has been described with reference to preferred embodiments, workers skilled in the art will recognize that changes can be made in form and detail without departing from the spirit and scope of the invention.

What is claimed is:

1. A method for measuring a change in an applied environmental condition relative to a reference environmental condition, the method comprising:

operating an optical interferometer under the applied environmental condition to generate an optical interference spectrum;

measuring intensities of the interference spectrum at first and second wavelengths, wherein the first and second wavelengths correspond to first and second reference intensities that are separated from one another by an odd number of extrema in the interference spectrum when the interferometer is operated under the reference condition; and measuring the change in the applied environmental condition based on the measured intensities and the first and second reference intensities.

2. The method of claim 1 wherein the step of measuring the intensities of the interference spectrum comprises:

measuring intensities of the interference spectrum at the first and second wavelengths, wherein the first and second wavelengths are separated from one another by at least three extrema in the interference spectrum when the interferometer is operated under the reference condition.

3. The method of claim 1 wherein the step of measuring the intensities of the interference spectrum comprises:

measuring intensities of the interference spectrum at the first and second wavelengths, wherein the first and second wavelengths are separated from one another by a single extremum in the interference spectrum when the interferometer is operated under the reference condition.

4. The method of claim 1 wherein the step of measuring the change in the applied environmental condition comprises measuring the change in the applied environmental condition based on the measured intensities at solely the first and second wavelengths.

5. The method of claim 1 wherein the step of measuring the intensities of the interference spectrum comprises measuring the intensities at solely the first and second wavelengths.

6. The method of claim 1 wherein the step of measuring the change in the applied environmental condition comprises comparing a difference between the measured intensities at the first and second wavelengths with a difference between the first and second reference intensities.

7. The method of claim 1 and further comprising:

generating voltages representative of the intensities of the interference spectrum at the first and second wavelengths; and wherein measuring intensities comprises measuring magnitudes of the voltages representative of the intensities.

8. The method of claim 1 and further comprising correlating the measured intensities with known values of the applied environmental condition to obtain a correlation relationship, and wherein the step of measuring the changes in the applied environmental condition comprises measuring a value of the applied environmental condition using the correlation relationship.

9. The method of claim 1 wherein the first and second wavelengths are selected such that the first and second reference intensities lie at approximately extrema in the slope of intensity as a function of wavelength in the interference spectrum when the interferometer is operated under the reference condition.

10. The method of claim 1 and further comprising:

operating the interferometer under the reference environmental condition;

measuring the intensity as a function of wavelength in the interference spectrum under the reference environmental condition;

selecting the first and second wavelengths such that the intensities in the interference spectrum at the first and second wavelengths lie on the respective sides of the odd number of extrema in the interference spectrum under the reference environmental condition; and storing the measured intensities at the first and second wavelengths under the reference environmental condition as the first and second reference intensities, respectively.

11. The method of claim 10 wherein the reference environmental condition lies within a range of expected applied environmental condition values.

12. A sensor for measuring a change in an environmental condition, the sensor comprising:

optical elements defining an optical path operably coupled to the environmental condition upon exposure of the sensor to the environmental condition;

a polychromatic light source optically coupled to the optical path;

a spectral element optically coupled to the optical path, which spatially disperses light received from the optical path as a function of wavelength;

first and second light sensitive elements optically coupled to the spectral element and positioned to receive light from the spectral element at selected first and second respective wavelength ranges, the first and second light sensitive elements having outputs representative of light intensity within the first and second wavelength ranges; and means for measuring the change in the environmental condition based on the outputs of the first and second light sensitive elements and on first and second reference values which represent light intensities within the first and second wavelength ranges that are separated from one another by an odd number of extrema in intensity as a function of wavelength of the light spatially dispersed by the spectral element, when the sensor is exposed to a reference environmental condition.

13. The sensor of claim 12 wherein the first and second reference values represent light intensities that are separated by at least three extrema in intensity as a function of wavelength of the light spatially dispersed by the spectral element.

14. The sensor of claim 12 wherein the first and second reference values represent light intensities that are separated by a single extremum in intensity as a function of wavelength of the light spatially dispersed by the spectral element.

15. The sensor of claim 12 wherein the first and second wavelength ranges are selected such that the first and second reference values correspond to local extrema in slope in intensity as a function of wavelength when the sensor is exposed to the reference environmental condition.

16. The sensor of claim 12 wherein the means for measuring measures the change in the environmental condition based on a difference in the outputs of the first and second light sensitive elements relative to a difference in the first and second reference values.

17. The sensor of claim 12 and further comprising a linear charge-coupled device (CCD) array wherein the first and second light sensitive elements are formed by two elements of the linear CCD array.

18. A method of calibrating a sensor for measuring changes in an environmental condition, the method comprising:
    selecting an expected value of the environmental condition as a reference condition;
    operating a polychromatic interferometer under the reference condition to obtain an interference pattern in terms of an intensity as a function of wavelength;
    choosing first and second wavelengths that are separated from one another by an odd number of local extrema in the intensity as a function of wavelength; and
    storing a representation of the intensity of the interference pattern at the first and second chosen wavelengths.

* * * * *